United States Patent [19]
Levine et al.

[11] 3,755,228
[45] Aug. 28, 1973

[54] ETHERIFIED CROTONYLIDENEDIUREA RESINS IN EMULSION TEXTILE PRINTPASTES

[75] Inventors: Eli Levine, Union, N.J.; Robert F. Singer, Greenville, S.C.

[73] Assignee: Celanese Corporation, New York, N.Y.

[22] Filed: Apr. 20, 1971

[21] Appl. No.: 135,784

[52] U.S. Cl. ............ 260/29.4 UA, 8/62, 117/143 A, 260/39 P, 260/851
[51] Int. Cl. ............................................ C08g 51/24
[58] Field of Search ...................... 260/29.4 R, 67.5, 260/67.6 C, 29.4 UA, 39 P, 851; 8/116.3, 62, 74; 117/143 A

[56] References Cited
UNITED STATES PATENTS
3,518,043   6/1970   Petersen et al. ..................... 8/116.3
3,540,835   11/1970   Marco ............................. 8/116.3 X

*Primary Examiner*—Lorenzo B. Hayes
*Attorney*—Thomas J. Morgan, Marvin Turken and Charles E. Miller

[57] ABSTRACT

Oil-in-water emulsion textile printpastes are prepared wherein the active amino resin bonding component is etherified trimethylolated crotonylidenediurea.

11 Claims, No Drawings

ETHERIFIED CROTONYLIDENEDIUREA RESINS IN EMULSION TEXTILE PRINTPASTES

BACKGROUND OF THE INVENTION

Since their introduction approximately 20 years ago, resin-bonded pigments have achieved considerable commerical success as textile colorants, one big reason being that they are less expensive than dyes with similar properties. There are essentially two principal types of resin-bonded pigments in use at this time. The older and presently less commercially attractive type is the "water-in-oil" pigment printing emulsion; the newer and, at present, more important type is the "oil-in-water" pigment printing emulsion. Consequently, the latter type is the object of significant scrutiny in the scene of continuing efforts to enhance its properties and reduce its cost.

A typical oil-in-water pigment printing emulsion usually contains three major components: the pigment-bearing portion (referred to herein as the "color concentrate"), a mechanically-stable, synthetic latex (referred to herein as the "crock-reducing additive") and an unpigmented emulsion of mineral spirits in water, stabilized with a water-soluble resin, such as methyl cellulose. This unpigmented, stabilized emulsion (referred to herein as the "extender") also usually contains a resin of the type which is present in the color concentrate component.

A typical color concentrate presently enjoying commercial success is composed of an aqueous pigment dispersion, stabilized by low viscosity methyl cellulose, and an emulsion of a butylated melamine resin. While the function of the pigment is obvious, it is deemed worthwhile to point out that the methyl cellulose functions to stabilize the pigment dispersion by providing sufficient viscosity to prevent settling or stratification over extended periods of time. Upon application of the color concentrate to a substrate, such as a cotton fabric, the butylated melamine resin reacts with cellulose hydroxyl groups on the substrate and on the methyl cellulose stabilizer, thus providing a discontinuous, pigmented film which is firmly bonded to the substrate and which is characterized by a high degree of resistance to removal by laundering and by commonly used dry cleaning solvents.

The crock-reducing additive in the oil-in-water printpastes functions to prevent the removal of color from the substrate by abrasion. Latices used as crock-reducing additives are generally soft emulsion copolymers based upon styrene, methyl methacrylate, vinyl acetate, or the like, as the "hard" monomer and butadiene, ethyl acrylate, butyl acrylate, 2-ethylhexyl acrylate, or the like, as the plasticizing comonomer. The latices frequently contain minor quantities of carboxyl-containing monomers, hydroxyl-containing monomers and/or alkylolated monomers, such as N-methylolacrylamide.

The function of the extender is to permit dilution of the color concentrate to the desired shade without loss of desirable application viscosity and printing properties. The extender is an emulsion generally of inexpensive aliphatic solvent having a low kauri butanol (k.b.) value (such as mineral spirits having a k.b. between about 25 and about 38) in an aqueous phase containing thickener and emulsifier. The thickener most frequently used in a high molecular weight grade of methyl cellulose. Another compound of the extruder which is of critical importance is emulsified amino resin, such as butylated melamine resin, in quantities sufficient to react with the methyl cellulose component, rendering it insoluble and resistant to laundering upon application of the printpaste composition, i.e., the oil-in-water pigment printing emulsion, to the substrate, such as a cellulosic fabric. The criticality of this function is better understood when one considers that typical commercial printpastes frequently contain as much as 200 or more parts of extender concentrate per part of color concentrate. Failure to use a resin of sufficient reactivity to effectively insolubilize the methyl cellulose in the extender results in severe loss of color from the printed textile during laundering.

From the above description of oil-in-water textile printing pastes, it can be appreciated that the amino resin component plays a very important role. Not only must the amino resin, such as butylated melamine, be compatible with all the remaining components of an oil-in-water printpaste, but it must be able to insolubilize the protective colloid by reacting therewith as well as with the substrate. To meet these demanding specifications, in addition to others, such as cost, ready curability, ability to function without deleteriously affecting fabric or fiber strength, etc., a very special resin-forming monomer is required.

Quite surprisingly, just such a monomer has been found. Methods for preparing same and use thereof as the bonding resin in oil-in-water textile printpastes are taught herein in significant detail.

The Invention

According to the present invention, oil-in-water emulsion textile printpastes are prepared wherein the active amino resin bonding component is etherified trimethylolated crotonylidenediurea prepared as taught in copending U.S. Pat. application Ser. No. 135,749 filed of even date herewith by Alan L. Peterkofsky, James. E. Tracy, and Paul M. Schumacher and entitled "Etherified Trimethylolated Crotonylidenediurea and Its Use in Alkyd Resin Coating Compositions." The latter application is assigned to the same assignee as the instant application.

As will be seen in greater detail hereinafter, the novel "oil-in-water" pigment printing emulsions contemplated herein contain the amino resin bonding composition, viz., etherified trimethylolated crotonylidenediurea, in the color concentrate component of the printing emulsion as well as in any extender component. The crock-reducing additive component generally present in printpastes of the present invention is made up of conventional latices prepared from "hard" monomers and plasticizing comonomers of the type hereinbefore discussed. These and other details of the novel "oil-in-water" emulsion textile printpastes of the instant discovery will be pointed out more specifically hereinafter.

As to the active amino resin bonding composition of the present invention, however, it has the general formula:

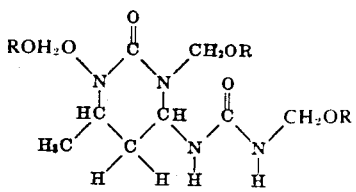

(C)

wherein R is H or the residue of a monohydric alcohol, at least one of said R moieties being the residue of a monohydric alcohol.

As will be seen hereinafter in more detail, compounds of the above formula (C) are derived from crotonylidenediurea (A), known as CDU, or its trimethylolated derivative, viz., trimethylolated crotonylidenediurea (B), referred to herein as TMCDU, and prepared as taught in copending U.S. Pat. application Ser. No. 53,028, filed July 7, 1970 by James E. Tracy, Alan L. Peterkofsky and William Lindlaw and assigned to the same assignee as the instant application.

Etherification with a monohydric alcohol provides compounds of the formula (C), above, which are soluble in organic solvents and help impart this same solubility to alkyd resin coating compositions containing these compounds.

Typical monohydric alcohols useful for the etherification reactions contemplated herein are branched and straight-chain alkanols having up to about 12 carbon atoms; aromatic monohydric alcohols, e.g., benzyl alcohol, and the like; cycloalkanols, e.g., cyclohexanol, cyclopentanol, cycloheptanol, and the like, usually having about four to about eight carbon atoms in the ring; monoethers of glycols, such as Cellosolve and Carbitol compositions; and substituted monohydric alcohols wherein the substituent is inert in that it does not enter into or hinder the etherification reaction or deleteriously affect, say, the effectiveness of the ultimate coating composition or the compounding thereof. Typical substituents are halogen atoms, such as chlorine and bromine, and other like inert moieties.

The etherified trimethylolated crotonylidenediurea compounds (C), for convenience referred to herein as etherified TMCDU, may be prepared in several ways. For example, crotonylidenediurea CDU is reacted with a formaldehyde-monohydric alcohol solution, such as Formcel under controlled conditions of temperature and pH. Formcel is a trademark of Celanese Corporation, New York, New York for aqueous alcohol-formaldehyde solutions; methyl Formcel and butyl Formcel refer to aqueous alcohol-formaldehyde solution mixtures, respectively, wherein the alcohol components are methanol and butanol. The resulting product is the etherified TMCDU shown in formula (C) above. When methyl Formcel is the reactant, R of formula (C) is $CH_3$; likewise, when butyl Formcel is the reactant, R is $CH_3CH_2CH_2CH_2$-.

If desired, CDU may first be reacted with formaldehyde and methylolated according to copending U.S. Pat. application Ser. No. 53,028 alluded to above and the resulting methylolated product TMCDU reacted with, say, a lower alkanol and the novel product used in the present invention, viz., etherified TMCDU, recovered.

The above just-mentioned processes may be described in equation form as follows:

EQUATION I

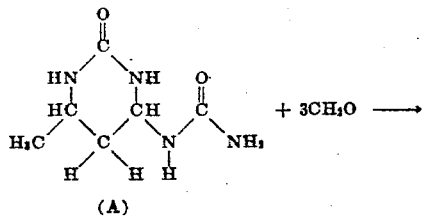

(A)

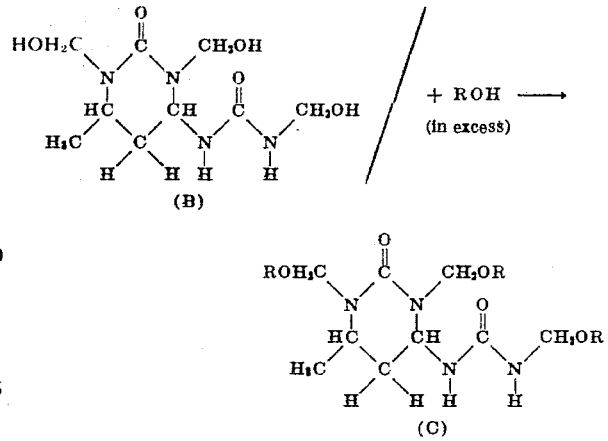

Alternatively, a butyl Formcel solution or like reactant may be employed in a one-step process as follows:

EQUATION II

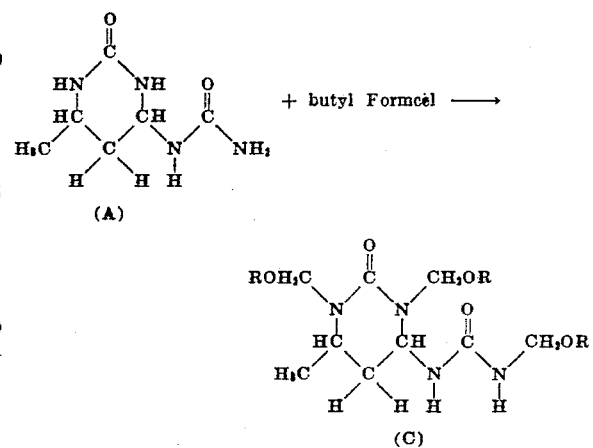

via., butylated TMCDU wherein R is H or -$CH_2CH_2CH_2CH_3$ (butyl), at least one R being butyl.

Reactant (A), above, viz. crotonylidenediurea, may be prepared by reacting urea with acetaldehyde in an acidic hydroxylic medium, e.g., as described in U.S. Letters Patent No. 3,190,741. While it has been found that crotonylidenediurea suitable for use in the present invention is conveniently and preferably prepared according to the following procedure, it should be understood that other methods of synthesis can be used, parts and percentages being by weight unless otherwise indicated: Thus, 270 parts of urea is added to a mixture of 99 parts of acetaldehyde and 600 parts of distilled water in a suitable conventional reaction vessel. The resultant solution is heated to a temperature of about 60° C. Thirty parts of phosphoric acid (catalyst) is then added and the temperature is thereafter maintained at between about 60° C and about 70° C for 1 hour. Crotonylidenediurea begins to separate from the reaction mixture as formed. The reaction mixture is subsequently cooled to ambient temperature whereupon crystallization of the product crotonylidenediurea continues and is completed. The product is separated from the supernatant liquid by filtration, washed with water, and dried in vacuo. The yield of white, solid crotonylidenediurea (135.3 grams) is 69.9 percent of the theoretical based on the weight of acetaldehyde. Elemental analysis of the product corresponds to the formula $C_6H_{12}O_2N_4$ and the infrared spectrum thereof (nujol mull) is identical to that reported in the literature (cf. Japanese Letters Patent No. 492,348) for crotonylidenediurea.

Reaction of crotonylidenediurea with formaldehyde pursuant to Equation I, above, is preferably accomplished by contacting crotonylidenediurea with between about 2.80 and about 5.0 molar equivalents of formaldehyde in a hydroxylic medium. The hydroxylic solvent used should be capable of being removed from the aminoplast material (B) formed in the reaction by evaporative means. The preferred solvent is water. The total concentration of the reactants in the hydroxylic medium is not critical.

In especially preferred modes of Equation I, reaction is conducted with formalin, i.e., an aqueous solution of formaldehyde in which the concentration of the latter is between about 35 and about 40 percent, or with paraformaldehyde, an oligomer, as the HCHO source. The amount of formaldehyde used, as indicated above, between about 2.80 and about 5.0 molar proportions, preferably between about 2.90 and about 3.05 molar proportions, per molar proportion of crotonylidenediurea. The use of formaldehyde in amounts such that the molar ratio of formaldehyde to crotonylidenediurea is less than about 2.80:1 is not as desirable because the trimethylol crotonylidenediurea would in such case be contaminated with substantial quantities of materials which could be deleterious in the finished resin. For the same reason, the use of formaldehyde: crotonylidenediurea molar ratios in excess of about 3.05:1 is less desirable, and the use of ratios in excess of about 5:1 is particularly undesirable.

The reaction between crotonylidenediurea and formaldehyde is catalysed by acid or base. Reaction can also be carried out without added catalyst. While the natural acidity of formalin is sufficient, reaction times are much longer. In effect, also, acidic pH's are created during the reaction by conversion of some of the $CH_2O$ to formic acid. In aqueous media, the reaction can be conducted at a pH of less than or greater than 7. Desirably, the reaction is conducted under basic conditions. Preferably, the reaction is conducted at a pH of greater than about 8 and less than about 12, with a pH of between about 9 and about 10 being especially preferred.

The temperature and pressure at which the crotonylidenediurea and formaldehyde are reacted are not critical. Desirably, the reaction is conducted at an elevated temperature and atmospheric pressure, with a temperature corresponding to the atmospheric reflux temperature of the reaction menstruum being preferred. The time required for completion of the reaction is generally less than 1 hour. The exact time required depends upon the reaction temperature, concentration of the catalyst (i.e., the pH) and reactants. A conventional titration method for determining when a particular reaction system has reached equilibrium is referred to in connection with Example I hereinbelow.

The reaction product mixture may be filtered to remove insolubles prior to reacting with an etherifying reactant. To obtain an etherified TMCDU product suitable for use in emulsion textile printpastes, e.g., solvent-soluble etherified TMCDU, water is removed. When etherifying with butanol, for example, the water can be removed by azeotropic distillation as the etherification is carried out. A similar process may be followed with other alcohols contemplated herein, such as cyclohexanol, benzyl alcohol, and the like.

With methanol, however, the bulk of the water is generally evaporated before etherification is performed. The water remaining after etherification can then be removed by co-distillation of methanol and water from the resulting resin product (methylated trimethylolated crotonylidenediurea) until essentially all the water is removed. The water-free resin can then be diluted to the desired solids content with a nonaqueous solvent. Thus, in the case of methylation, it is usually simpler to strip the aqueous TMCDU solution to near dryness, add methanol, carry out etherification, and strip off any water remaining after the first stripping step, as well as water of reaction formed during etherification, as a methanol co-distillate.

A wide range of temperatures may be used. Broadly, temperatures between about 30° C and about 230° C are contemplated herein, depending upon the monohydric alcohol employed.

Good results are achieved, for example, at atmospheric reflux using butanol. When methylating, however, lower temperatures, such as 55° C, provide very good results. Normally, temperatures in the range of about 45° C to about 205° C are employed. Of course, higher temperatures are indicated should pressures above atmospheric pressure be desired; likewise, subatmospheric pressures dictate proportionately lower temperatures. Another virtue of the present invention is that it permits not only a wide choice of temperatures and pressures, but it functions well as a continuous, semi-continuous or batch process.

Generally, a broad pH range provides suitable results. Reaction is best carried out, however, at an acid pH in the range of about 1.5 to about 6.5, preferably between about 2.3 and about 5.5.

Concentrations best suited for the monohydric alcohol reaction step may vary considerably and generally range between about 2.80 and about 6.0 molar equivalents, preferably between about 3.0 and about 5.5 molar equivalents of the monohydric alcohol, based on the molar amount of TMCDU present in the reactant mixture. In the case of methanol, however, a range between about 2.8 and about 20.0, preferably between about 5.0 and 12.0, molar equivalents is desirable. Consequently, an overall range for the monohydric alcohol is from about 2.8 to about 20.0 molar equivalents.

The one-step process of Equation II, above, has a number of inherent advantages. In the first place, the aqueous monohydric alcohol-formaldehyde solution (hydroxylic medium is preferred) may be selected so as to expeditiously and efficiently provide high yields of etherified TMCDU by what may be an in situ conversion from CDU to TMCDU to etherified (e.g., alkylated) TMCDU.

Typically, an aqueous 55 percent methyl Formcel solution containing 34–35 percent methanol and 55 percent formaldehyde (percentages by weight) is readily reacted at controlled temperatures and pH with CDU to provide, in a direct, one-step process, the corresponding etherified trimethylolated crotonylidenediurea. Although a wide variety of pH conditions may be used quite successfully, it is preferred to operate at a pH in the range of about 1.5 to about 6.5, preferably about 2.3 to about 5.5.

While best results are achieved at the atmospheric reflux temperature of the aqueous reaction mixture, the one-step process admits of a wide range of temperature and pressure conditions. Generally, temperatures in the range of about 30° C to about 230° C, normally between about 45° C and about 205° C, are used. In other words the temperatures, pressures, concentrations and other conditions described with respect to the etherification step (2) of Equation I are suitable and desirable in the instant one-step process of Equation II, for much the same reasons given in discussing step (2) of Equation I. Likewise, the one-step process employed may be continuous, semi-continuous or batch.

The oil-in-water printpastes contemplated herein are generally prepared by blending; a color concentrate (a) containing an active amino resin bonding component of the present invention; a crock-reducing additive (b) containing, for example, an aqueous dispersion of elastomeric styrenated-acrylic copolymer; and an extender (c), also containing an active amino resin bonding component of the present invention. The resulting printpaste is applied to (printed on) a fabric, e.g., a cotton fabric, and the thus treated cloth cured at elevated temperatures. As will also be seen hereinafter in greater detail, the printed fabric is subjected to home laundering conditions and conventional dry cleaning. Commercial printpaste is likewise used to treat cotton fabric and identically tested to provide laundering and dry cleaning effects for comparative purposes.

The color concentration (a) component may be easily prepared by blending to uniform consistency a typical commercial printing paste and a methyl cellulose solution; usually a sufficient amount (minor) of pigment dispersing agent, e.g., aqueous sodium lauryl sulfate paste, is provided to prevent aggregation of pigment solids and to facilitate achieving uniform consistency; in addition, a small amount of ammoniacal solution, triethanolamine, or other like substance is provided in the blend to keep the latter at optimum alkaline pH for best results, as is well known in the art.

The amount of protective colloid used, such as aqueous methyl cellulose, in the blend is a function of the amount of pigment present, since sufficient methyl cellulose is needed to provide the desired viscosity and to avoid settling or stratification of the final color concentrate blend over extended periods.

Into this blend is introduced the active amino resin of the present invention, preferably in emulsion form. The amino resin should be present in a concentration which will insolubilize the protective colloid by reacting (as hereinbefore described) with hydroxyl groups on the methyl cellulose and on the substrate, thus bonding the methyl cellulose - pigment printpaste composition to the substrate. Obviously, an insufficient amount of amino resin will result in methyl cellulose being solubilized (when laundering, for example) and consequent loss of pigment. Generally, from about 2.5 to about 7.5 parts by weight of amino resin per part of methyl cellulose is used, preferably from about 4.5 to about 6.5 to achieve the results contemplated herein.

As suggested just above, the active amino resin of the present invention is preferably in emulsion form when introduced into the color concentrate blend. A preformed emulsion will generally be prepared from a solvent solution of the amino resin and sufficient of an aqueous solution of low viscosity methyl cellulose to provide the desired emulsion viscosity. Typically, an aqueous solution of low-viscosity methyl cellulose is prepared by pre-wetting the methyl cellulose with mineral spirits and adding same slowly to water, with agitation, until the methyl cellulose is fully dissolved. The resulting solution is then mixed with more water, generally in the presence of a minor amount of surfactant, until uniform consistency is achieved. To this solution is slowly added, with agitation, the aforementioned solvent solution of active amino resin and mixing continued until the resulting emulsion is uniform. Generally, an organic solvent is used as a medium for the amino resin of the present invention. For example, a blend of xylol and a lower alkanol, say, butanol, is a very effective solvent medium.

The crock-reducer component (b) contemplated herein is almost any of the conventional, mechanically-stable, synthetic latices used in printpastes (oil-in-water) to prevent the removal of color from the substrate by abrasion. Typically, as hereinbefore described, the crock-reducer is made up of a "hard" monomer and a plasticizing comonomer; in addition, the crock-reducer latices usually contain minor amounts of hydroxyl-containing, carboxyl-containing and/or alkylolated monomers.

Generally, a controlled amount of crock-reducing latex is used, to prevent color removal by abrasion, in the total printpaste compositions herein contemplated. Typically, from about 0.5 to about 3.0 parts by weight, preferably from about 1.0 to about 2.0 parts, is used per part of color concentrate component (a).

The extender (c) component is preferably an emulsion prepared by pre-wetting methyl cellulose with mineral spirits and adding some slowly, and with good agitation, to water generally containing minor amounts of both a pigment dispersing agent of the type hereinbefore described and a pH controlling agent, e.g., aqueous ammonia. Once the methyl cellulose is fully dissolved and the solution essentially free of undissolved solids, the desired concentration of active amino resin, based upon the amount of methyl cellulose present in solution, is slowly added along with a sufficient amount of mineral spirits to achieve the desired extender consistency. For good results the amino resin is present in the extender in concentrations of about 0.5 to about 2.5, preferably about 0.75 to about 2.0, parts by weight per part of methyl cellulose.

Alternatively an extender concentrate is prepared containing: methyl cellulose pre-wet with mineral spirits, the active amino resin, aqueous ammonia and the pigment-dispersing agent. To this concentrate are added the water and mineral spirits desired to achieve the extender (a) components having the consistency just described, above. In an oil-in-water emulsion printpaste of the type contemplated herein the extender may generally be present in concentrations between about 9.0 and about 300 parts by weight, based on the weight of the color concentrate. As indicated hereinbefore, the extender permits dilution of the color concentrate to the desired shade without loss of desirable printing properties.

In both of the alternate extender preparations just described, the active amino resin component is best introduced as an emulsion prepared as hereinabove described, using methyl cellulose, mineral spirits, water, a surfactant and, of course a solvent solution of the active amino resin of the present invention.

The present invention will best be understood from the following illustrative examples which are not intended to impose undue limitations on the spirit and scope of the instant discovery: (In the examples which follow concentrations are given in parts and percentages by weight, unless otherwise indicated.)

EXAMPLE I

This example teaches the preparation of an etherified trimethylolated crotonylidenediurea. Reactant n-butyl Formcel solution (2,060 parts) containing 824 parts of formaldehyde (40 percent by weight), 1,092 parts of butanol (53 percent by weight) and 144 parts of water (7 percent by weight) is charged to a reaction vessel equipped with a phase separation head. Formcel is a trademark of Celanese Corporation, New York, New York, for aqueous alcohol-formaldehyde solutions; methyl Formcel and butyl Formcel refer to aqueous alcohol-formaldehyde solution mixtures, respectively, wherein the alcohol components are methanol and butanol. The pH of the n-butyl Formcel reactant in the reactor is adjusted to 2.3 by the addition of an aqueous solution containing 88 percent formic acid. To this solution is added 860 parts of recrystallized crotonylidenediurea and 610 parts of n-butyl alcohol. The resulting mixture is heated to atmospheric reflux temperature and maintained thereat with azeotropic distillation until a total of 519 milliliters of water are separated. Next, 50 percent of the unreacted butanol in the product mixture is stripped off and replaced with sufficient xylol to obtain a 50/50 solvent blend and the resulting product mixture is cooled to 35° C. Dicalite Contains 149.6 parts of formaldehyde (55 percent by weight), 95.2 parts of methanol (35 percent by weight) and 10 percent water is added thereto and the mixture filtered. (Dicalite Contains 149.6 parts of formaldehyde (55 percent by weight), 95.2 parts of methanol (35 percent by weight) and 10 percent water is a trademark for a siliceous inorganic filter aid of diatomaceous earth sold by Johns-Manville Company).

EXAMPLE II

An amount (272.0 parts) of 55 percent Formcel¹ is charged to a reaction vessel, and the pH is adjusted to a value of 3.0 by the addition of sufficient 25 percent aqueous formic acid. To the reaction vessel is then added 172.0 parts of COU. The system is heated to reflux temperature (about 96° C) and maintained thereat for approximately 1 hour. At the end of this period, the temperature of the reaction mixture is reduced to approximately 55° C, followed by the addition of 262.0 parts of methanol. This temperature is maintained for a period of about 2 hours, during which time the pH is kept constant at 3.0 by the addition of appropriate quantities of 25 percent formic acid or 10N sodium hydroxide. At the end of the two-hour holding period, the reaction system is cooled to ambient temperature and the pH adjusted to 7.8. The reaction mixture is then filtered and evaporated under reduced pressure to remove excess methanol and water to reaction. The resulting residue of methylated trimethylol crotonylidenediurea is redissolved in sufficient isopropanol to produce a solution containing 50 percent solids.

EXAMPLE III

Example II is repeated in every essential respect with the exception that methyl Formcel is replaced by a mixture of 405 parts of 37 percent formalin (Uninhibited) and 688 parts of benzyl alcohol. The system is likewise heated to atmospheric reflux temperature for one hour and then cooled to approximately 55° C by the addition of another 500 parts of benzyl alcohol. Subsequent to this step Example II is followed in every essential detail and benzylated trimethylol crotonylidenediurea thus produced.

EXAMPLE IV

To a suitable reaction vessel equipped with conventional agitation means are charged 239 grams (2.94 moles) of 37 percent formaline ("uninhibited") and 15 grams of a 10 percent aqueous solution of sodium carbonate. To the resulting mixture is added, with agitation, 172 grams (1.0 moles) of crystalline crotonylidenediurea. The reaction mixture, which has a pH of between about 9 and about 9.5, is heated to reflux temperature over the course of about 20 minutes and maintained at the reflux temperature for about 5 minutes. The reaction mixture is then cooled to ambient temperature, the pH is adjusted to 7.0, and the reaction mixture filtered to remove insolubles. The clear filtrate contains 2.8 percent free formaldehyde as determined by the "sodium sulfite method" described in Walker, Formaldehyde, 3d ed., p. 486 (Reinhold, N.Y. 1964) The concentration of aminioplast material in the aqueous filtrate is 60 percent by weight as determined gravimetrically, i.e., by evaporating an aliquot sample of the solution at 70° C for 6 hours and weighing the residue. The clear filtrate thus produced is charged to a reaction vessel equipped with a phase separation head, and the pH is adjusted to a value of 3.0 by the addition of 25 percent aqueous formic acid. An amount (5,000 grams; 50 moles) of cyclohexanol is added to the reaction vessel and the system heated to reflux temperature and azeotropic distillation of water from the reaction mixture is continued until the temperature reaches about 130° C. To guard against product resin decomposition or polymerization, azeotropic distillation during the final stages is carried out under vacuum. The system is then cooled to ambient temperature and the product cyclohexylated trimethylol crotonylidenediurea adjusted to the desired solids content.

EXAMPLE V

The product of Example I, above, is made up into an emulsion suitable for use in a color concentrate (a) and in an extender (c). Slowly, under agitation, 400 parts of the Example I product (53.8 percent non-volatile; solvent 50 percent xylol, 50 percent n-butanol) is added to a uniform mixture of:

| | Parts |
|---|---|
| 5% solution of low viscosity methyl cellulose | 334.0 |
| Triton*770 (30% alkyl aryl sulfonate solids) | 66.0 |
| Water | 100.0 |

The resulting emulsion contains 24.0 percent resin solids. Of course, agitation of the total mixture is continued until the emulsion is uniform (Triton Contains 149.6 parts of formaldehyde (55 percent by weight), 95.2 parts of methanol (35 percent by weight) and 10 percent water 770 is a trademark for a surfactant sold by Rohm & Haas). The 5.6 percent solution of low viscosity methyl cellulose introduced into the above mixture is made from:

|  | % |
|---|---|
| Methyl Cellulose (400 cps grade) | 5.6 |
| Mineral spirits* | 7.4 |
| Water | 87.0 |
|  | 100.0 |

*Contains 149.6 parts of formaldehyde (55 percent by weight), 95.2 parts of methanol (35 percent by weight) and 10 percent water (an aliphatic solvent cut, kauri butanol value between 25 and 38)

The methyl cellulose is pre-wet with mineral spirits and then added, slowly, to the water, under agitation. Mixing is continued until the methyl cellulose is fully dissolved.

EXAMPLE VI

The butylated trimethylolated crotonylidenediurea emulsion of Example V is used to prepare a blue color concentrate as follows:

| | | Parts |
|---|---|---|
| 1. | Pigment Blue L Paste, 20 pigment solids (an aqueous dispersion of phthalocyanine blue pigment; sold by GAF Corp., New York, N.Y.) | 328.0 |
| 2. | Duponol*WAQ sodium lauryl sulfate paste, 30% active (*trademark for pigment dispersing agent sold by E.I. duPont deNemours Co., Wilmington, Delaware) | 10.0 |
| 3. | Ammonia solution (28.5%) | 1.6 |
| 4. | Solution (5.6%) of 400 cps grade methyl cellulose, prepared as taught in Example V, above. | 40.0 |
| 5. | Butylated trimethylolated crotonylidenediurea emulsion (24% resin, non-volatile), prepared as taught in Example V, above | 88.4 |
| | | 468.0 |

Materials 1, 2, 3 and 4, above, are charged to a mixing tank and mixed to uniform consistency with a high-speed enclosed turbine mixer. Material 5 is then added slowly to this mix with good agitation which is continued until the total color concentrate resulting is of uniform consistency.

EXAMPLE VII

The butylated trimethylolated CDU emulsion of Example V, above, is likewise used to prepare an extender as follows:

| | | Parts |
|---|---|---|
| 1. | Water | 463.0 |
| 2. | Ammonia solution (28.6%) | 2.5 |
| 3. | Sodium lauryl sulfate (30% paste described in Example V, above) | 16.5 |
| 4. | Methyl cellulose (4000 cps grade) | 3.0 |
| 5. | Mineral spirits (same as in Example V, above) | 6.0 |
| 6. | Mineral spirits (same as in Example V, above) | 491.0 |
| 7. | Butylated trimethylolated CDU emulsion (24% resin, non-volatile), prepared as taught in Example V, above. | 11.5 |
| | | 993.5 |

Materials 1, 2 and 3, above are charged to a mixing tank. Materials 4 and 5 are pre-mixed and added to the mixing tank slowly and, with good agitation, blended with the three materials already in the tank. When the methyl cellulose is fully dissolved and the resulting solution is free of lumps and grains of undissolved material, emulsion 7 is added and then, slowly, material 6 is introduced and admixed with the total blend.

EXAMPLE VIII

The color concentrate of Example VI, a commercial crock-reducing latex and the extender of Example VII are blended to produce two separate printpastes which are compared with two other printpastes made by blending the same commercial crock-reducing latex with commercial color concentrate and a commercial extender. The following tabulation teaches the four printpastes and the concentrations of each component in each printpaste:

TABLE I

| Component | Printpaste | | | |
|---|---|---|---|---|
| | A | C | D | B |
| Color concentrate of Ex. VI | 1.0 | - | - | 1.0 |
| Commercial color concentrate[1] | - | 1.0 | 1.0 | - |
| Commercial crock-reducing latex[2] | 1.0 | 1.0 | 1.0 | 1.0 |
| Extender of Example VII | 18.0 | - | - | 98.0 |
| Commercial extender[3] | - | 18.0 | 98.0 | - |
| Parts: | 20.0 | 100.0 | 20.0 | 100.0 |

1. Aquaprint 3G 57124 color concentrate (containing butylated melamine) sold by Inmont Corporation, New York, N.Y.; Aquaprint Contains 149.6 parts of formaldehyde (55 percent by weight), 95.2 parts of methanol (35 percent by weight) and 10 percent water is the trademark used on the product.
2. Aquaprint 5943 LOW Crock Additive (aqueous dispersion of elastomeric styrenated acrylic copolymer) sold by Inmont Corporation, New York, N.Y.; Aquaprint Contains 149.6 parts of formaldehyde (55 percent by weight), 95.2 parts of methanol (35 percent by weight) and 10 percent water is the trademark used on the product.
3. Aquaprint Extender Concentrate 5928 (containing butylated melamine) sold by Inmont Corporation, New York, N.Y.; to which sufficient mineral spirits and water are added to achieve essentially the amino resin concentration of the extender of Example VII and; in short, the 18.0 and 98.0 parts of extender set out in printpastes C and D is not based on the concentrate, but, as in the case of the extender of printpastes A and B, on the total emulsion.

The components of Table I are blended by means of a conventional homogenizer used in mixing color concentrate, crock-reducing latex and extender until the desired printpaste uniformity is achieved.

EXAMPLE IX

Printpastes A, B, C and D are applied to 80 × 80 denier, bleached, desized cotton using a conventional laboratory roller printing machine. The resulting printed cloth is cured at 300° F for 3 minutes. All four printpastes exhibited desirable application properties.

Sections of the printed cloth are then subjected to the American Association of Textile Chemists and Colorists (A.A.T.C.C.) 4 wash test to determine the relative launder-resistance of the two experimental colors A and B and their commercial counterparts C and D. The results are checked by washing under home laundry conditions. Launder-resistance of the experimental color is judged to be the equal of their commercial counterparts.

Other sections of the printed cloth are subjected to the A.A.T.C.C. 85-1968 dry cleaning test to determine the relative resistance to perchlorethylene of the two experimental colors A and B and their commercial counterparts C and D. The results are checked by having sections of the cloth dry cleaned in a commercial plant which uses perchlorethylene. Dry cleaning resistance of the experimental colors is judged to be the equal of their commercial counterparts.

Pursuant to statutory requirements, there are described above the invention and what are now considered its best embodiments. It should be understood, however, that the invention can be practiced otherwise than as specifically described, within the scope of the appended claims.

What is claimed is:

1. In an oil-in-water printpaste having a color concentrate comprising a pigment and a bonding resin; the improvement comprising, as said resin, a trimethylolated crotonylidenediurea etherified with a monohydric alcohol selected from the group consisting of alkanols having up to about 12 carbon atoms, benzyl alcohol, and cycloalkanols having about four to about eight carbon atoms in the ring.

2. The product of claim 1 wherein the etherified trimethylolated crotonylidenediurea has the formula

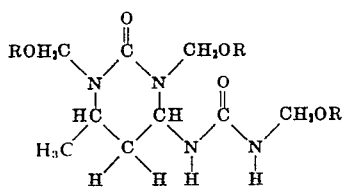

wherein R is H or the residue of a monohydric alcohol selected from the group consisting of alkanols having up to about 12 carbon atoms, benzyl alcohol, and cycloalkanols having about four to about eight carbon atoms in the ring, at least one of said R moieties being the residue of said monohydric alcohol.

3. The product of claim 2, wherein R is methyl.

4. The product of claim 2 wherein R is butyl.

5. The product of claim 2 wherein R is benzyl.

6. The product of claim 2 wherein R is cyclohexyl.

7. The oil-in-water emulsion printpaste of claim 2 additionally comprising a crock-reducing latex comprising a "hard" monomer selected from the group consisting of styrene, methyl methacrylate, and vinyl acetate, and a plasticizing co-monomer selected from the group consisting of butadiene, ethyl acrylate, butyl acrylate, and 2-ethylhexyl acrylate.

8. The product of claim 7 additionally comprising an extender comprising an unpigmented emulsion of mineral spirits in water.

9. The product of claim 8 wherein the color concentrate and the extender are each emulsified prior to being blended with the crock-reducing latex.

10. The product of claim 9 wherein the active amino resin is itself emulsified prior to forming a color concentrate therewith.

11. The product of claim 9 wherein the active amino resin is itself emulsified prior to forming an extender emulsion therewith.

* * * * *